3,201,333
BRINE PREPARATION
Walter J. Sakowski, Youngstown, N.Y., assignor to Olin Mathieson Chemical Corporation, a corporation of Virginia
Filed Mar. 28, 1962, Ser. No. 183,148
1 Claim. (Cl. 204—99)

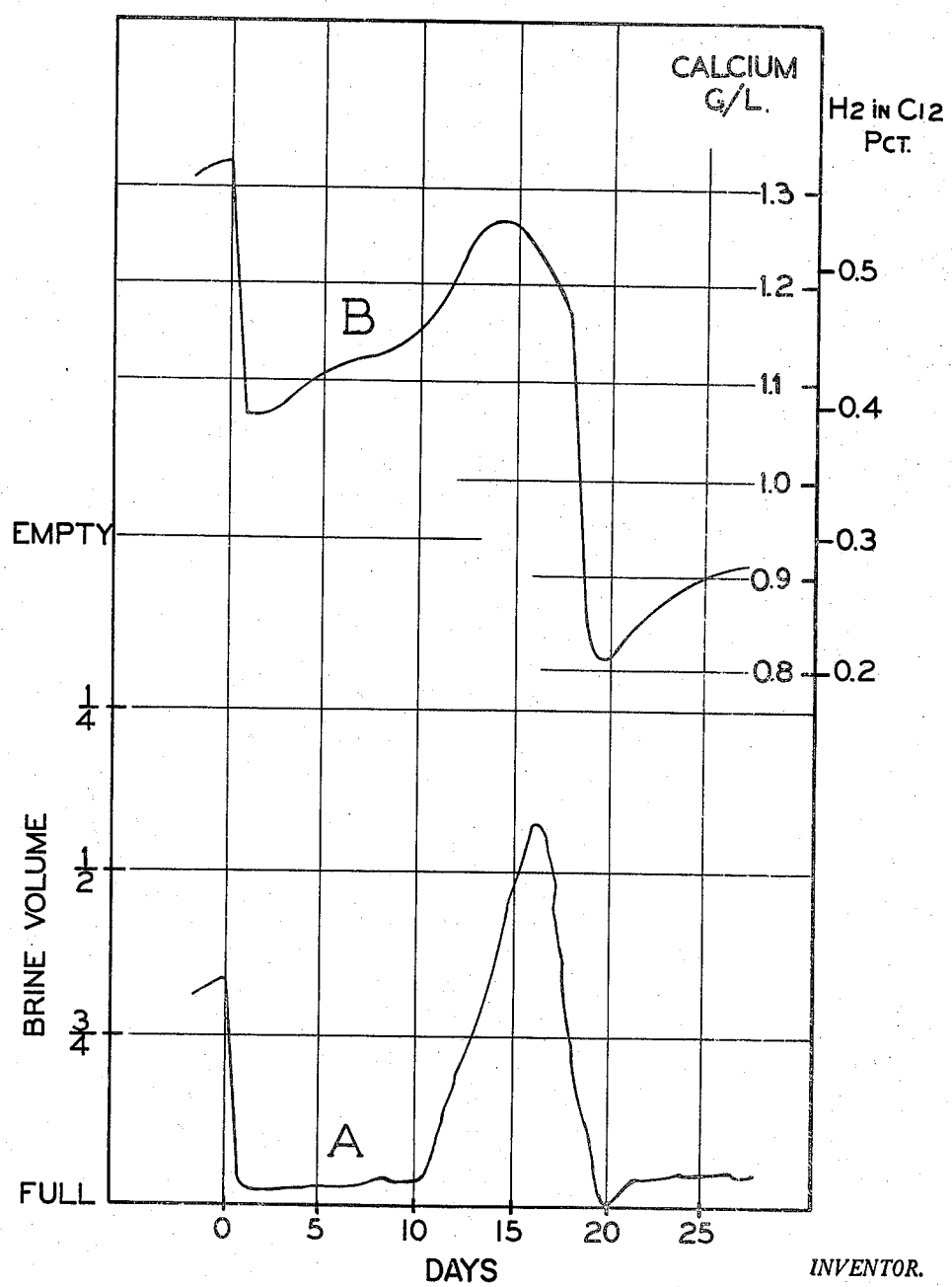

This invention relates to the preparation of sodium chloride brine from solid salt and to a mode of operation of the brine supply for brine-utilizing processes. More particularly, this invention relates to the operation of a brine system supplying electrolytic cells, especially mercury cathode cells.

In the electrolysis of sodium chloride brine in mercury cathode cells, a strong, aqueous solution of sodium chloride is introduced into the cells where a portion of the solute is decomposed. The alkali metal is dissolved in the mercury cathode to form an alkali metal amalgam and chlorine gas is liberated at the anodes. Relatively weak brine is removed from the cells. It is dechlorinated, fortified with additional solute, purified and returned to the cells. In mercury cell operation, the purity and concentration of the brine are especially important for efficient operation. As a result, the brine treating plant may be larger and require more operating personnel than the electrolysis portion of the plant. As much as 10,000,000 gallons or more of brine may be in process in many mercury cell plants. Details of the prior art operation of both parts of a mercury cell plant are well-known; see, for example, Ind. Eng. Chem., v. 45, No. 9, pp. 1824–1835 (1953).

This invention relates particularly to improvements in controlling the inventory of brine in process and results in unexpected advantages in reducing impurities in the brine with resulting improvement in cell operation and production. The method of the present invention in one aspect comprises providing a volume of brine having substantially the capacity of the brine system, for a time introducing make-up water substantially equal to the amount of water removed by evaporation thus maintaining the volume of the brine substantially constant, then for a time introducing no make-up water to reduce the inventory to a volume about ¼ to ¾ capacity, then introducing as rapidly as possible sufficient make-up water to restore the inventory substantially to capacity. Alternatively the make-up water is introduced continuously but in amounts less than that removed by evaporation until the volume is ¼ to ¾ capacity and then rapidly filling to capacity.

In normal operation of mercury cell electrolytic chlorine-caustic plants and in many other commercial processes, a steady state of operations is the ideal sought. In mercury cell plants, a steady rate of production of chlorine and caustic permits constant utilization of electric power and prediction and meeting of shipping commitments. It has previously been assumed, too, that maintenance of the brine supply for mercury cells at a constant volume is essential for satisfactory operation of the plant.

In the brine system, the effluent weak brine from the cells is dechlorinated by aeration or vacuum or both. Material amounts of water are removed from the brine in this operation. Lesser quantities are removed in the 100 percent humidity of the chlorine gas generated in and removed from the cells. Removal of water in these ways and removal of sodium as sodium amalgam and chlorine as gas from the cells gradually reduces the volume of brine in the system unless the water and salt are replenished. In past practice, these losses have been made up by the addition of water and salt to maintain the volume and salt content of the brine at substantially constant values. Usually the dechlorinated weak brine is passed through a bed of salt crystals, suitably rock salt, to dissolvers, post dissolvers, treating tanks, surge tanks, settlers, filters and storage tanks.

It has now been found that surprising and unexpected improvements in mercury cell operations are produced by reducing the volume inventory of brine at intervals and then, as rapidly as possible, substantially increasing the volume inventory of brine. The brine inventory is controlled by the amount of make-up water supplied to the salt dissolving zone. When the amount of make-up water is less than the amount of water removed by evaporation, the brine inventory decreases and when it is more the brine inventory increases. In a preferred form of the invention, the addition of make-up water at intervals is completely discontinued until evaporation has materially reduced the brine inventory, for example, to about three-fourths to one-half or less of its possible maximum, considering the capacity of the available equipment. The volume inventory is depleted, for example, from a total of 500,000 gallons to 200,000 gallons. It may be advantageous, at times, to introduce additional aeration and/or dehydration equipment and operations to accelerate the removal of water and the reduction of brine inventory. Then, as rapidly as possible, the brine inventory is increased to near-capacity by rapid introduction of make-up water.

In an alternative mode of operation, the make-up water is not completely discontinued but is restricted to reduce gradually the brine inventory. When the inventory is reduced materially to, say, half the maximum possible operating inventory, make-up water is introduced as rapidly as possible to increase the brine inventory to substantially the maximum operating capacity.

During these volume changes of the brine inventory, the salt content of the strong brine fed to the cells is maintained at its normal concentration. This value may be, for example, about 310 grams per liter. During periods when, by control of make-up water, the brine inventory is held near a constant volume or is decreasing, the calcium ion content of the brine tends to rise to an equilibrium value dependent on the temperature in the dissolver, the rate of introduction of make-up water and, to a minor degree, other factors characteristic for any particular brine system. The calcium ion content of the brine tends to rise, for example, to about 1.1 to 1.3 grams per liter and the hydrogen in the chlorine rises to about 0.5 percent.

Suitably when the hydrogen in the chlorine rises to about 0.5 percent by volume, the supply of brine fed to the cells is supplemented as rapidly as possible by the introduction of make-up water to the salt dissolving zone and incorporation of the resulting brine in the brine system where it is purified and circulated to the electrolytic cells. In the rapid dissolution of rock salt which is an impure, commercial grade of sodium chloride, the sodium chloride rapidly approaches its limit of solubility and it is no problem to form a partly saturated brine of the desired concentration, for example, 300 to 320 grams per liter. Calcium sulfate is the principal impurity in commercial salt and is particularly undesirable in brine for electrolysis, increasing the hydrogen content of the chlorine and forming "thick mercury" in the cells. Calcium sulfate approaches its limit of solubiilty in sodium chloride brine very slowly. The rapid passage of make-up water through a bed of solid salt particles produces an effluent which may be nearly saturated with sodium chloride but carries only a quarter or some small fraction of its limiting solubility of calcium sulfate. The amount of dissolved calcium sulfate carried in the brine to the cells is materially reduced. This results in significant reduction of thick mercury in the cells and hydrogen in the chlorine.

FIGURE 1 is a graph showing the effect of the surging operation of the present invention on the calcium ion content of the brine and the hydrogen content of the chlorine. Line A represents the daily inventory of brine and is read using the "Brine Volume" scale at the left of the graph. The "Brine Volume" scale shows "Empty" at the top and "full" at the bottom. The daily average calcium ion content of the brine and also the hydrogen content of the chlorine using the appropriate scale at the right of the graph. The period of days prior to and to the left of zero in the scale of "Days" shows part of a period when no make-up water was added to the system. While the brine inventory decreased, the calcium ion content of the brine and the hydrogen content of the chlorine increased slowly. During zero day the brine inventory was brought to full capacity, sharply reducing calcium ion and hydrogen. During a part of the next 15 days the brine inventory was maintained substantially constant and then make-up was cut off. The brine inventory was reduced and the calcium ion and hydrogen increased. Through error, between about the 15th and 17th days, a make-up water valve was partly opened resulting in a slow increase in brine inventory and an accompanying slow drop in both calcium ion and hydrogen. During the 17th to 19th day, the brine inventory was brought to full capacity with a dramatic decrease in both calcium ion and hydrogen.

*Example I*

A chlorine-caustic plant was composed of a system of electrolytic mercury cells, a brine system and suitable auxiliary equipment. The brine system comprised suitable tanks, agitators, settlers, piping and pumps to fortify recycle brine by dissolving salt therein, to alkalize and purify the brine by the addition of suitable alkalies and other treating chemicals to settle, filter and store the purified, fortified brine and to adjust the pH of the brine for return to the electrolytic cells. For an extended period the brine system was operated to maintain a constant volume inventory of brine by feeding make-up water and salt to salt-dissolving means in the same proportions in which water was removed from the brine by evaporation and in which salt was removed by electrolysis. The total volume of brine was maintained near the capacity of the brine system. During this continuous replenishing of water removed by evaporation and of sodium chloride removed by electrolysis, the calcium ion content of the brine rose from about 0.9 to about 1.0 gram per liter. The hydrogen in the chlorine averaged between about 0.4 and 0.5 percent by volume.

During a successive period of about nine consecutive days, the volume inventory of brine was decreased to about two-thirds of its normal capacity by supplying less water and salt to the system than was removed therefrom. The calcium ion content rose to 1.3 grams per liter and the hydrogen in the chlorine rose to over .5 volume percent. On the tenth day, in less than 24 hours, the brine volume was brought up to its normal capacity by rapid introduction of appropriate amounts of water and salt. Analyses on the eleventh day showed the calcium content of the brine was reduced to 1.06 grams per liter and the hydrogen in the chlorine dropped to about 0.4 percent.

*Example II*

Subsequently the operations of Example I were continued for a period of about 10 days supplying make-up water and salt in amounts substantially equal to the water removed by evaporation and the salt removed by electrolysis. During the next consecutive 9 days no make-up water was added to the salt-dissolving zone and the inventory of brine was decreased to slightly less than half the capacity of the brine system. The calcium ion content of the brine slowly rose to a maximum of 1.26 grams per liter and the hydrogen in the chlorine rose to about 0.55 percent. During a period of about 2 days, the inventory of brine was increased by rapidly introducing water and salt in quantities substantially greater than the amounts removed by evaporation and electrolysis. The inventory of brine was made up to near total capacity. The calcium ion content of the brine dropped to 0.8 gram per liter and the hydrogen in the chlorine fell to 0.21 percent.

*Example III*

During a period of 20 days the amount of make-up water supplied to the salt dissolver in the brine system was about three-fourths of the amount of water removed from the brine by evaporation. The inventory was reduced to about three-fifths of its original volume while the calcium ion content of the brine gradually rose to 1.2 grams per liter and the hydrogen in the chlorine rose to 0.52 percent. Make-up water was then introduced at the capacity of the line and by the second day the volume of the brine was near normal operating capacity. The calcium ion content of the brine dropped to about 0.95 and the hydrogen in the chlorine to about 0.3 percent.

What is claimed is:

The method of cyclically controlling the volume of a body of aqueous sodium chloride brine from which aqueous brine is supplied to mercury cathode electrolytic cells which comprises:

(1) Continuously electrolyzing a portion of said body of aqueous brine in a mercury cathode electrolytic cell to produce sodium amalgam, chlorine gas and weak brine;

(2) Continuously removing water vapor from said weak brine to decrease the water content of the process;

(3) Continuously cycling said weak brine to a salt-dissolving zone containing solid sodium chloride and calcium sulfate to resaturate said weak brine;

(4) Intermittently adding make-up water to said salt-dissolving zone with sufficient speed to substantially saturate the make-up water with sodium chloride while leaving the calcium sulfate content of the salt substantially undissolved;

(5) Passing the resulting resaturated brine to step (1) above.

References Cited by the Examiner

UNITED STATES PATENTS

| 2,753,242 | 7/56 | Davis | 204—98 |
| 2,876,182 | 3/59 | Hopper et al. | 204—99 |
| 2,902,418 | 9/59 | Burns | 204—99 |
| 2,949,412 | 8/60 | Neipert et al. | 204—99 |

OTHER REFERENCES

Industrial and Engineering Chemistry, 1953, vol. 45, No. 9, pages 1824–1835.

WINSTON A. DOUGLAS, *Primary Examiner.*

JOSEPH REBOLD, MURRAY TILLMAN,
*Examiners.*